United States Patent [19]

Watson

[11] Patent Number: 4,845,834
[45] Date of Patent: Jul. 11, 1989

[54] TOOL CLAMPING MECHANISM

[75] Inventor: Robert C. Watson, Waukesha County, Wis.

[73] Assignee: Kearney & Trecker Corporation, Milwaukee, Wis.

[21] Appl. No.: 158,672

[22] Filed: Feb. 22, 1988

[51] Int. Cl.[4] .................................... B23Q 3/157
[52] U.S. Cl. ............................. 29/568; 294/116
[58] Field of Search ............ 29/568; 294/110.1, 110.2, 294/115, 116; 414/739; 901/32, 36, 39

[56] References Cited

U.S. PATENT DOCUMENTS

| | | | |
|---|---|---|---|
| 3,013,517 | 12/1961 | Isaam | 294/116 X |
| 3,200,492 | 8/1965 | Lehmkuhl | 29/568 |
| 3,630,391 | 12/1971 | Wilson | 294/116 |
| 3,964,616 | 6/1976 | Piotrowski | 29/568 X |
| 4,126,233 | 11/1978 | Veske | 29/568 X |
| 4,164,290 | 8/1979 | Zankl | 414/739 |
| 4,211,123 | 7/1980 | Mack | 294/116 |
| 4,348,044 | 9/1982 | Wood, III | 294/115 |
| 4,650,237 | 3/1987 | Lessway | 901/39 |

FOREIGN PATENT DOCUMENTS

| | | | |
|---|---|---|---|
| 3011837 | 10/1981 | Fed. Rep. of Germany | 901/36 |
| 462247 | 1/1914 | France | 294/116 |
| 137676 | 9/1979 | German Democratic Rep. | 29/568 |
| 144944 | 11/1980 | Japan | 29/568 |
| 865600 | 9/1981 | U.S.S.R. | 29/568 |
| 1085751 | 4/1984 | U.S.S.R. | 29/568 |
| 1313703 | 5/1987 | U.S.S.R. | 901/36 |
| 1302098 | 1/1973 | United Kingdom . | |
| 2183595 | 6/1987 | United Kingdom | 294/110.2 |

OTHER PUBLICATIONS

"Gripper for Industrial Robots", by U. Cardaun, pp. 40-43, Fordern Und Heben, vol. 28, No. 1, 1978.

*Primary Examiner*—William Briggs
*Attorney, Agent, or Firm*—James J. Skarsten; Raymond J. Eifler; John R. Benefiel

[57] ABSTRACT

A tool clamping mechanism (12) is provided for a tool engaging arm having a frame or chassis (18) which is moved along a path of travel toward a tool (47). The mechanism includes a tool contact member or tongue (60) and preferably includes a pair of spaced apart fingers (40) positioned to engage a groove formed in the tool (47). The tongue (60) is mounted for movement along the path of travel with the frame, such as by means of bar (62) joined to the fingers, a pin (67) supported by the bar and projecting through a slot in the tongue (60), and a rod (72) attached to the tongue which extends into the frame (18) along a bore (75). Such mounting arrangement enables the frame (18) to continue to move toward the tool (47) after the tongue (60) has contacted the tool, thereby achieving relative motion between the frame (18) and tongue (60). Jaws (48) are mounted on the fingers for movement from a tool release position to a tool clamping position in response to a force generated by applied to the jaws by means of rollers (70) mounted on the tongue (60) which act against cammed surfaces (54) of jaws (48).

8 Claims, 4 Drawing Sheets

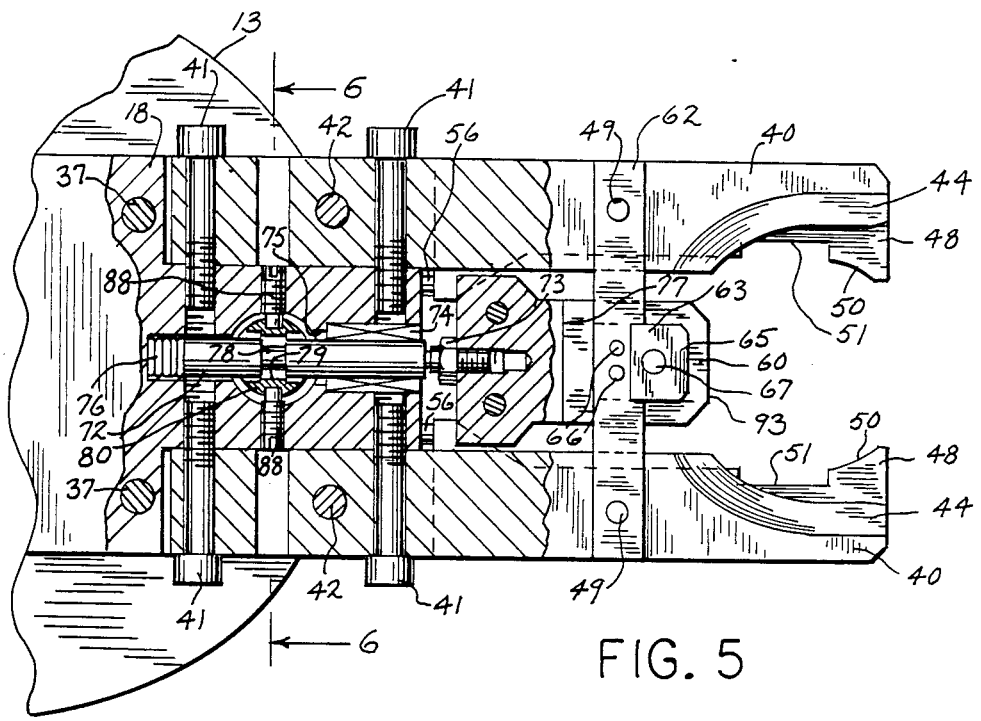
FIG. 5
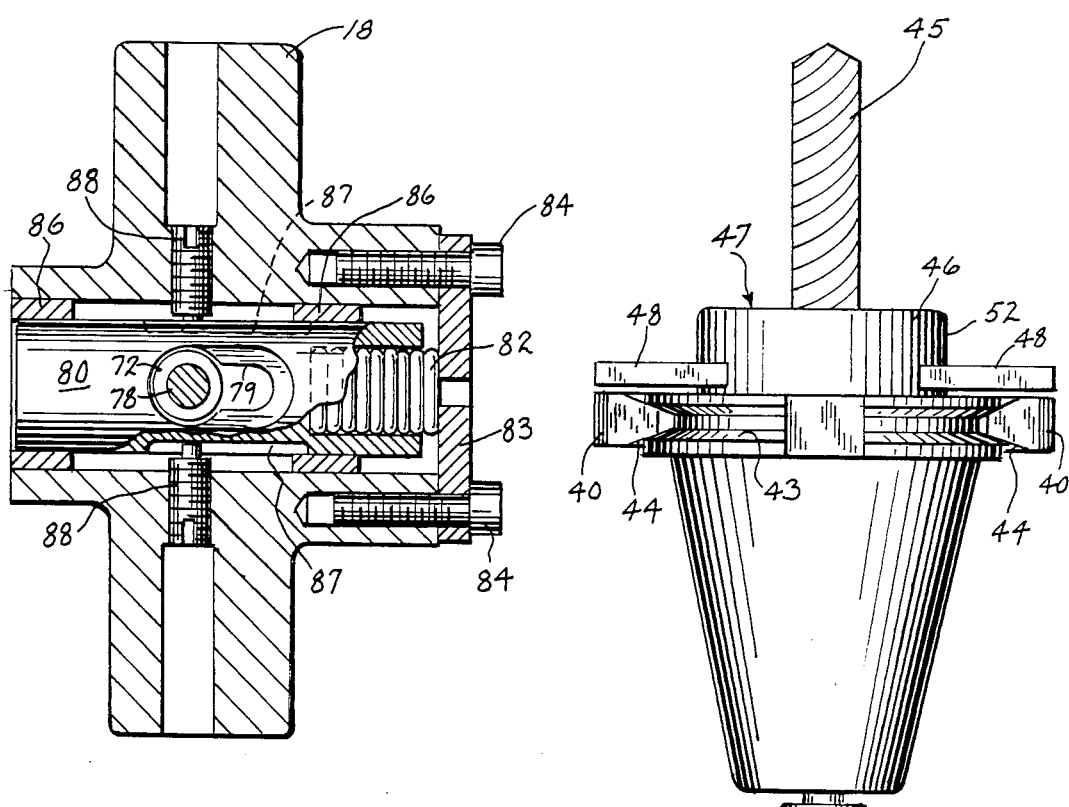
FIG. 6
FIG. 4

TOOL CLAMPING MECHANISM

BACKGROUND OF THE INVENTION

1. Field Of The Invention

This invention relates to a tool clamping mechanism for use in a tool engaging arm, such as the tool arm of a machining center or other machine tool, or of a robot arm.

2. Discussion Of The Prior Art

Tool changers for transferring cutting tools between a storage magazine and a machine tool spindle are well known in the machine tool arts. Typically, a tool changer comprises a tool change arm and some means for moving or successively positioning the arm as a tool change operation is performed. A tool change arm, in turn, typically includes a frame or support structure, and a clamping mechanism or like means mounted on the frame for grasping a tool to remove it from the magazine or spindle, and for solidly holding the tool as it is carried therebetween. Many different types of such grasping and clamping means have been tried in the past, involving complicated mechanisms which have been accident prone, expensive to manufacture, and subject to excessive failure.

Some prior clamping mechanism have relied upon a separate actuator for causing the mechanism to grasp the tool, after it has been moved into a tool engagement position. In addition to being complicated, these mechanisms have relied upon the actuator to remain energized during movement of the arm and tool between the magazine and spindle, in order to maintain tool clamping. In the event of a power failure or a failure of the actuator or a control component, it was possible that the mechanism could release, causing the tool to be dropped or thrown.

Many of the above and other clamping mechanisms would also execute clamping motion regardless of whether or not there was actually a tool in position to be clamped. Without a tool in position for clamping, the motion was both unnecessary and hazardous.

SUMMARY OF THE INVENTION

The invention provides a tool clamping mechanism for a tool engaging arm which overcomes the above disadvantages. The mechanism includes a frame, a tool contact member, and at least one jaw mounted on the frame for movement between tool clamping and tool release positions. The mechanism further includes means for movably mounting the tool contact member on the frame so that when the tool engaging arm is moved along a path of travel toward a tool, the contact member initially moves with the frame. However, the mounting means positions the contact member to contact or butt against the tool while the frame is still moving along the path. Since further advancement of the contact member is prevented by contact with the tool, relative movement thereupon occurs between the frame and contact member. Jaw actuating means are positioned between the tool contact member and each of the jaws for applying to the jaws a force generated by the relative movement to move each of the jaws from its tool release position to its tool clamping position. Thus, the motion of the tool change arm toward the tool terminates in the tool being captured by the tool clamping mechanism. Preferably, the jaw actuating means applies a force to the jaws along a direction which is opposite to the direction of the tool change arm in moving toward the tool.

In a preferred form, a pair of jaws are provided which comprise elongated members having tool gripping elements at one end and angled or cammed surfaces at the other end. The jaws are pivotally mounted on the tool arm frame, and the contacting member moves in translation relative to the frame. The contacting member includes a tongue which contacts a tool as the tool arm approaches the tool, and the actuating means comprises rollers mounted on the tongue to act against the cammed surfaces of the jaws to move the tool gripping elements toward each other. Thus, the tongue, rollers and jaws work together to capture the tool in three point contact.

In another aspect of the invention, means are provided for locking the jaws in the tool clamping position. Preferably, the locking means is biased to its locked mode so that when the mechanism is in the clamping position, the jaws are automatically locked shut to positively secure the tool between them. Moreover, power means are advantageously located at selected positions of the tool change arm as it moves through a tool change cycle, to allow release of the locking means only when the tool change arm is in one of such selected positions.

Therefore, it is an object of the invention to provide a simple and reliable tool clamping mechanism for a tool engaging arm.

Another object is to provide a tool clamping mechanism for a tool engaging arm which does not require a separate actuator to grasp the tool.

It is another object of the invention to provide a tool clamping mechanism which is positively locked in a clamped position.

It is another object of the invention to provide a tool clamping mechanism which can be released from the clamped position only when the tool engaging arm is in certain positions relative to the spindle and tool storage magazine of an associated machine tool.

It is another object of the invention to provide a tool clamping mechanism which will only clamp if a tool is present.

These and other objects of the invention will become more readily apparent from the ensuing specification when taken together with the drawings.

DESCRIPTION OF THE DRAWINGS

FIG. 4 is a view taken along lines 4—4 of FIG. 1.

FIG. 5 is a plan view with a portion broken away of the tool clamping mechanism located at one of the ends of the tool change arm of FIG. 1.

FIG. 6 is a sectional view taken along the lines 6—6 of FIG. 5.

DETAILED DESCRIPTION OF THE PREFERRED EMBODIMENT

Figure 1:
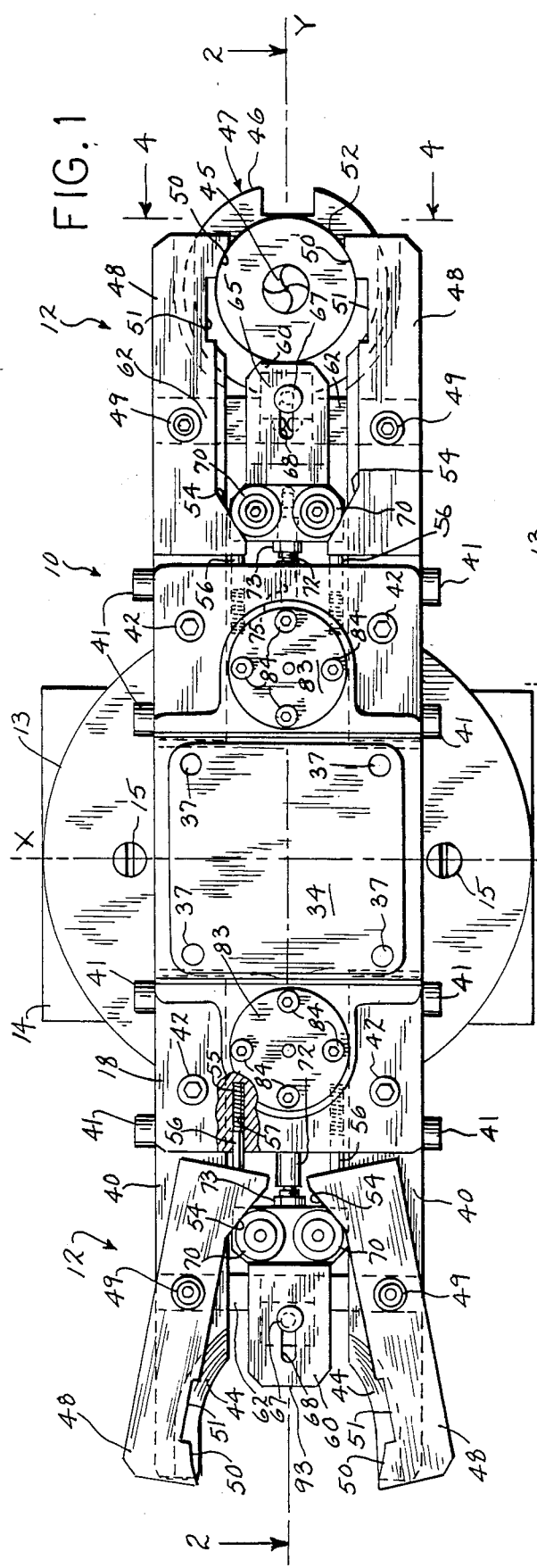
FIG. 1 is a plan view showing one side of a tool change arm for a machine tool incorporating a tool clamping mechanism of the present invention at each of its ends, and further showing a tool clamped in the mechanism at the right end thereof.

FIG. 1 shows a tool change arm 10 incorporating two identical tool clamping mechanisms 12 of the present invention, one mechanism being located at each end of the arm. The tool change arm 10 is rotatably mounted, as hereinafter described, upon structure such as a plate member 13. Plate 13 is rigidly secured to a tool arm carrier 14 which selectively moves the tool change arm 10 relative to X-, Y- and Z axes, respectively labeled in FIGS. 1 and 2, to exchange a tool between a machine tool spindle and a magazine (not shown). The design and construction of a suitable tool arm carrier 14 is considered to be well known in the machine tool arts. One such carrier is illustrated, for example, by the tool changer carriage shown in U.S. Pat. No. 4,164,810, issued Aug. 21, 1979 to Sipek et al. Accordingly, FIG. 1 shows only a portion of the tool arm carrier 14, and such portion is depicted schematically. Plate 13 is secured to carrier 14 such as by means of bolts 15. Carrier 14 is preferably constructed to rotate arm 10 about the Z-axis, and to translate arm 10 along the Y-axis.

Figure 2:
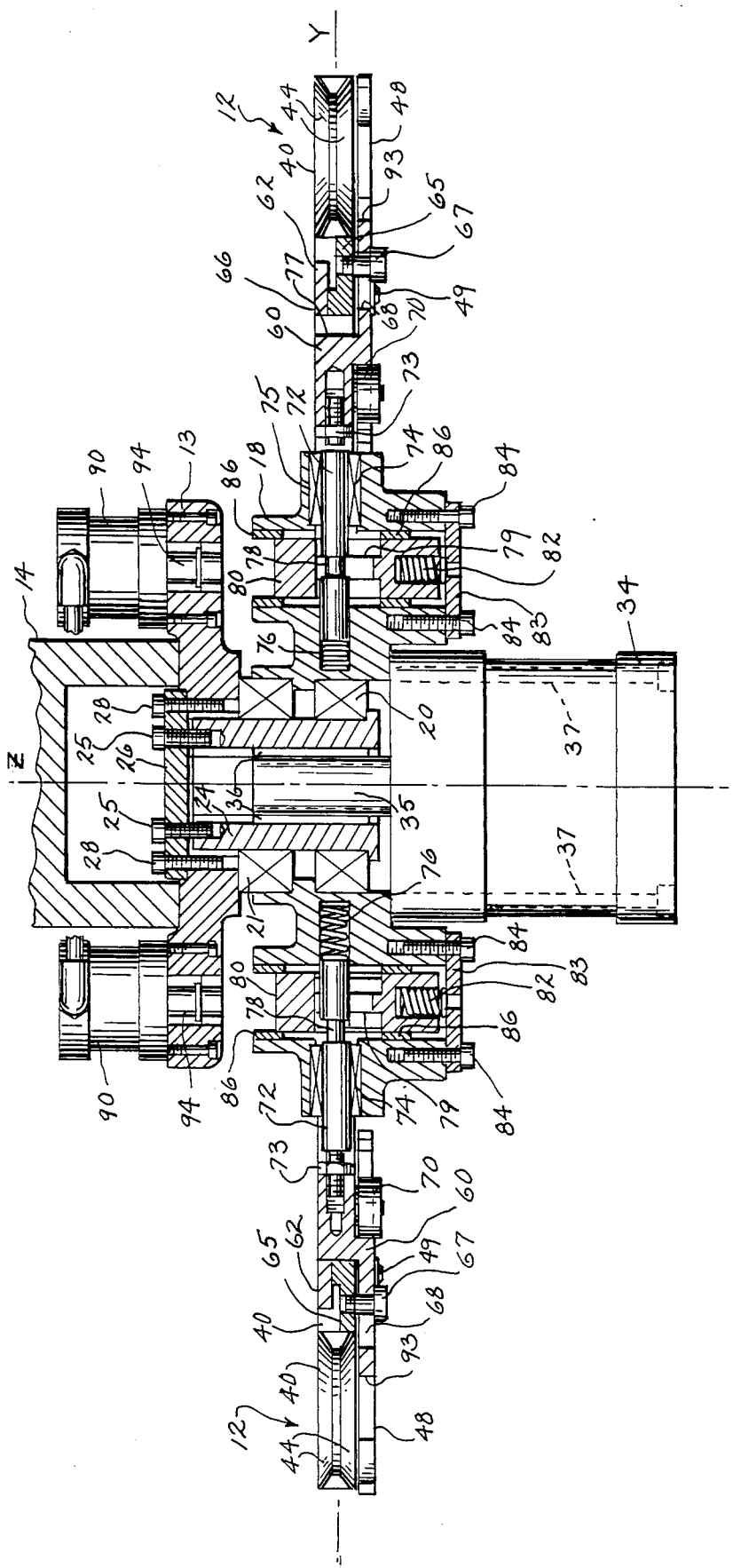
FIG. 2 is a view partially in section of the tool change arm of FIG. 1 taken along lines 2—2 of FIG. 1 but not showing the clamped tool.

As shown in FIG. 2, the arm 10 has a frame or chassis 18. Anti-friction bearings 20 and 21 are interposed between the chassis 18 and a sleeve 24 which is attached to an end plate 26 by means of cap screws 25. End plate 26 in turn is bolted to plate 13 by means of cap screws 28, to achieve the desired rotational relationship between plate 13 and arm 10. The body of a hydraulic motor 34, or other suitable power device for actuating rotary motion of arm 10, is fixed to the chassis 18 by fasteners such as bolts 37. The motor body is in rotational relationship with a motor shaft 35, which extends out from the motor body and into the sleeve 24. The sleeve 24 and shaft 35 have mating keyways, which are secured in alignment by keys 36. The shaft 35 of motor 34 is thus held fixed relative to plate 13, whereas the body of motor 34 is rotatable relative to the plate 13. Therefore, when the motor 34 is powered the motor body is rotatably driven and the arm 10, including the clamping mechanisms 12, rotate in unison therewith.

Figure 3:
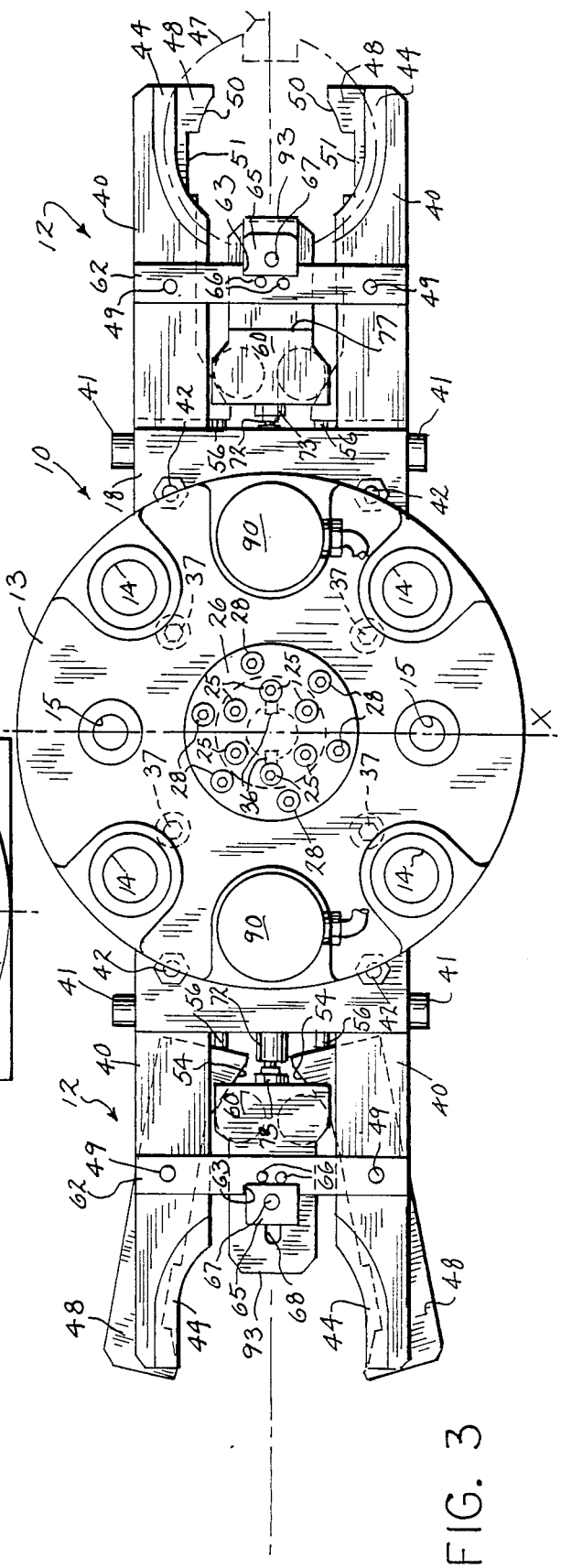
FIG. 3 is a plan view of the side of the tool change arm opposite the side shown in FIG. 1, and showing the tool in phantom lines.

FIG. 3 shows each clamping mechanism 12 including a pair of fingers 40, each finger 40 immovably secured to chassis 18 by means of a cap screw 41 and a cap screw 42. The fingers 40 of each pair are in spaced apart relationship and have inside edges 44 tapered to fit into a tapered circumferential groove, such as the conventional groove 43 of an ANSI standard tool 47 positioned in the space between the fingers. Such groove is best shown in FIG. 4. As used herein, the term "tool" includes a cutting tool 45 which may be of many different forms e.g., a drill bit as shown or a milling cutter secured in a conventional tool holder 46.

FIG. 3 further shows a bar 62 traversing the space between each of the pairs of fingers 40 and rigidly secured to its corresponding fingers at its ends by means of cap screw bearings 49. A notch 63 is formed in the central portion of each bar, facing outwardly, to avoid interference in engaging a tool 47. A key member 65 is rigidly mounted on each bar 62 by means of cap screws 66, and projects outwardly toward the opening between the corresponding fingers 40. Each key member 65 is sized to enter a keyway 92 of a tool 47 positioned in the space between the corresponding fingers. By providing each clamping mechanism 12 with a key member 65, a tool 47 engaged by the mechanism will be angularly oriented in a known fixed position relative to the arm 10.

Referring once more to FIG. 2, it will be seen that key member 65 has an L-shaped cross-section. Thus, key member 65 extends downwardly beneath its bar 62, as viewed in FIG. 2 as well as outwardly therefrom.

Referring once more to FIG. 1, it will be seen that each of the bars 62 and associated key members 65 serve to support and guide movement of a tongue 60, in addition to performing the above-described tool orientation function. A pin 67 is firmly attached to each key member 65 and projects through a slot 68 formed through the corresponding tongue 60. Each tongue 60 is movable relative to its key member 65, and each slot 68 is oriented along the Y-axis, as viewed in FIG. 1. A locking rod 72 is threaded into the inside end of each tongue 60 and secured therein by means of a locknut 73. Each rod 72 extends into the chassis along a bore 75, which is oriented along the Y-axis as viewed in FIG. 1. By providing the rod 72 and bore 75, as well as the pin 67 and slot 68, each tongue 60 is constrained to movement, relative to its bar 62 and member 65, along the Y-axis within the space between its associated pairs of fingers 40. A pair of rollers 70 is joined to an end of each tongue 60 for movement in unison therewith.

FIG. 1 shows each mechanism 12 further provided with a pair of jaws 48, each jaw pivotably mounted on a corresponding finger 40 by means of one of the screw bearings 49. Thus, the jaws 48 of a clamping mechanism 12 are pivotable toward each other, i.e., into a closed or tool clamping position, and pivotable away from each other, i.e., into an open or tool release position. The jaws of the mechanism 12 at the left end of the arm 10 of FIG. 1 are shown to be in an open position. The jaws of the mechanism 12 at the right end of such arm are shown to be in a closed position, engaging tool 47.

Each jaw 48 has an arcuate concave surface 50 formed in its outward end to mate with a cylindrical portion 52 of the tool 47, as best shown in FIG. 4. FIG. 1 shows each jaw 48 also having a recess 51 adjacent its concave surface 50 to provide clearance for the tool 47. A ramped or angled cam surface 54 is formed in the inward end of each jaw 48 and positioned in abutting relationship with one of the rollers 70 mounted on the corresponding tongue 60.

As best shown in connection with the clamping mechanism 12 located on the left side of the tool change arm 10, as viewed in FIG. 1, each jaw 48 is biased by means of a compression spring 55 located within a blind bore 57 in the chassis 18. One end of a rod 56 is inserted into the bore 57, in contact with the spring 55, and the other end of the rod 56 is coupled to a jaw 48. The rod 56 is connected to the jaw 48 at a position such that the outward force of the spring 55, acting through the rod 56, will pivot the jaw about the cap screw bearing 49 to bias the jaw in an open or tool release position.

As best shown in FIG. 5, a locking rod 72 is journaled for axial sliding movement in the chassis 18 by means of a bushing 74. The locking rod 72 extending into the chassis 18 abuts a compression spring 76 which biases the corresponding tongue 60 outwardly, toward the open position of the jaws 48. The tongue 60 is stopped in its outward motion by means of a shoulder 77 of the tongue 60, abutting the bar 62, as best shown in FIG. 2.

FIG. 5 shows the rod 72 to have a reduced diameter portion 78 which becomes aligned with a keyhold shaped slot 79 of a locking plunger 80 when the rod 72 and tongue 60 are moved to their leftward most positions, as viewed in FIG. 5. Leftward movement of rod 72 compressed spring 76. The leftward movement of tongue 60 causes the corresponding jaws 48 to pivot to their closed position, as described hereinafter.

The keyhold shape of slot 79 is best shown in FIG. 6. When rod portion 78 is moved into alignment with slot 79, compression spring 82 acts between the locking plunger 80 and en end plate 83, secured to the chassis 18 by screws 84, to urge portion 80 to the left as viewed in FIG. 6. The narrow plunger of slot 79 thus becomes fitted around the reduced diameter portion 78 of locking rod 72, to hold the rod 72 in fixed position. The spring 76 is thereby held in a compressed condition and the jaws 48 are held in closed position until the locking plunger 80 is re-cocked, by moving it rightward as viewed in FIG. 6, to the position shown therein. The locking plunger 80 is supported for sliding movement of a bore of the chassis 18 by means of bearings 86 and is provided with keyways 87 engaged by set screws 88, to prevent the plunger 80 from rotation. When plunger 80 is re-cocked, rod 72 is released, and spring 76 drives the rod 72 and tongue 60 to the right, as viewed in FIG. 5, whereby jaws 48 are pivoted to their open position.

To re-cock the plunger 80 of each clamping mechanism 12, air cylinders 90 are mounted to the plate 13, as shown in FIG. 2. The air cylinders are selectively located upon plate 13 so that pistons 94 of cylinders 90 become aligned with plungers 80 of respective clamping mechanisms 12 when the arm 10 is rotated into an angular position, relative to plate 13, in which the clamping mechanisms 12 will be able to release tools after insertion into a magazine or spindle. For example, air cylinders 90 may be centered along the Y-axis, as shown in FIGS. 1 and 3. After such alignment has been established, the cylinder corresponding to a mechanism 12 to be released is activated to drive its piston 94 downwardly as viewed in FIG. 2, against the aligned plunger 80. The plunger 80 will thus be forced downward against its spring 82, into its re-cocked position to release the rod 72.

By providing air cylinders 90 on plate 13 and positioning them as described, jaws 48 engaging a tool 47 cannot be opened unless arm 10 is rotated into the particular position required for a tool to be inserted into or removed from a spindle or magazine. The danger of inadvertently releasing a tool is thereby significantly diminished.

Figure 7A:
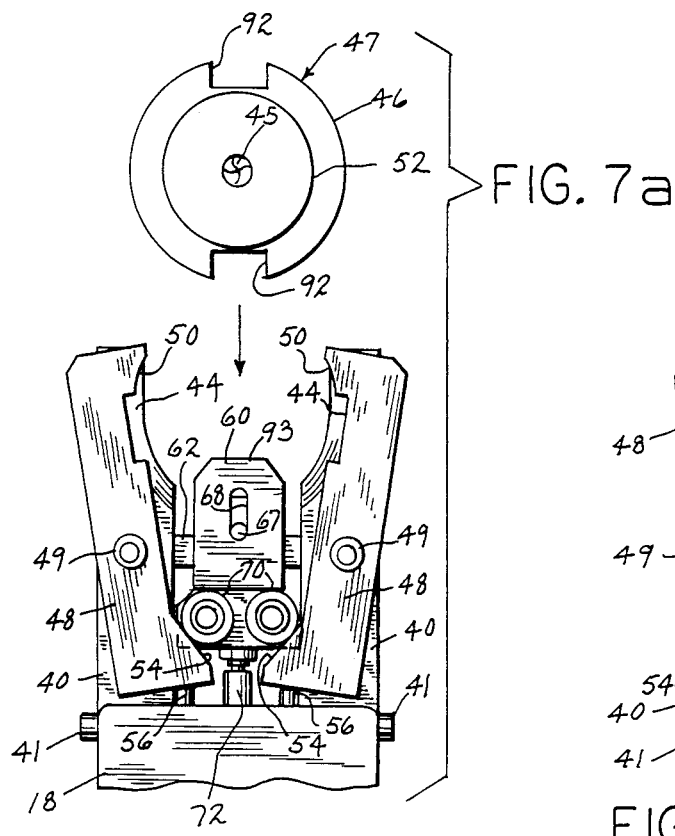
FIGS. 7a–d are a schematic progression showing how a tool is approached and clamped by one of the tool clamping mechanisms of the tool change arm of FIG. 1.

FIG. 7a shows one of the clamping mechanisms 12 of arm 10 moving along the Y-axis toward a tool 47, which may be held in a ready position by a magazine or a machine tool spindle. As the clamping mechanism approaches the tool 47, it is in the open or tool engagement position. Thus, the fingers 40 are aligned to enter the tapered groove 43 of the tool, and the jaws 48 are opened wide enough to clear the diameter of the cylindrical portion 52 of the tool.

Figure 7B:
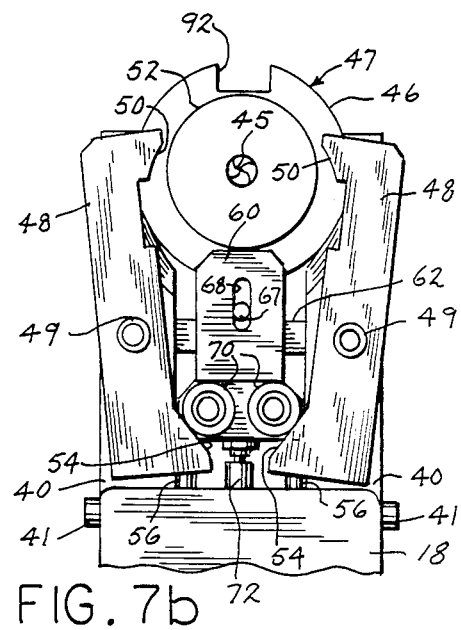
Figure 7C:
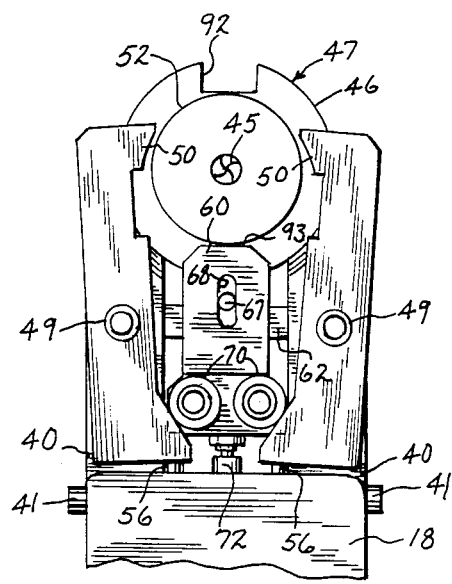
Figure 7D:
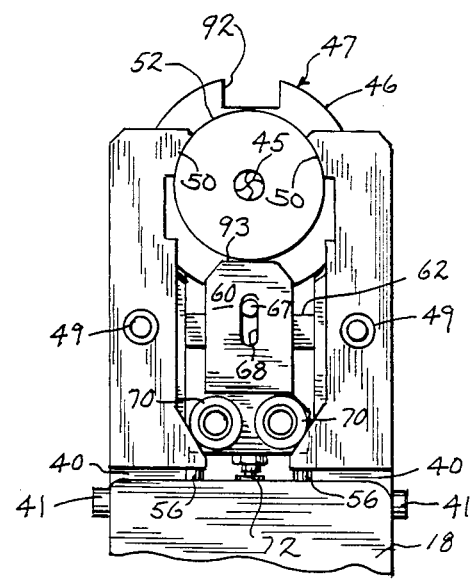

FIG. 7b shows key member 65 beginning to enter the keyway 92 of tool 47 as mechanism 12 continues its approach. A critical angular alignment between the arm 10 and the tool 47 will thus be maintained during tool change. At about the same time that the key 65 enters the keyway 92, the outside end 93 of the tongue 60 contacts the cylindrical portion of the tool. Further movement of tongue 60 and rollers 70 mounted thereon is thereby prevented. However, chassis 18, as well as fingers 40, key 65 and jaws 48 continue to move toward the tool 47. Thus, relative movement occurs between rollers 70 and jaws 48. Such movement drives rollers 70 against respective cammed surfaces 54 of the jaws 48 to move them as shown in FIGS. 7b and 7c toward the closed or tool clamping position. When tool change arm 10 reaches the end of its motion toward tool 47, as shown in FIG. 7d, mechanism 12 is in the tool clamping position. That is, jaws 48 are completely closed around the tool 47 to capture the tool in three point contact, between the tongue 60 and arcuate surfaces 50 of the jaws 48. Also, when mechanism 12 reaches its tool clamping position.

Key 65 becomes fully inserted into keyway 92, fingers 40 engage opposite sides of groove 43, and reduced diameter portion 78 of locking rod 72 becomes aligned with slot 79 of locking plunger 80, as previously described. Plunger 80 and string 82 then operate as described to hold the jaws 48 and tongue 60 in tight engagement with the tool. The tight grip on the tool is maintained as arm 10 is moved by operation of carrier 14 to transfer the tool to another location, such as to move it between a machine tool spindle and a magazine.

When the plunger 80 is re-cocked, by operation of a cylinder 90 as described above, spring 76 and springs 55 respectively act against rod 72 and rods 56 to return clamping mechanism 12 to the tool release position, shown in FIG. 7a.

Many modifications and variations of the preferred embodiment will be apparent to those of ordinary skill in the art but will still be within the spirit and scope of the invention. For example, the tool clamping mechanism of the invention could be mounted on the arm of an industrial robot rather than on a tool change arm for a machine tool. Therefore, the invention should not be limited by the scope of the preferred embodiment, but only by the claims which follow.

What is claimed is:

1. A tool clamping mechanism for a tool engaging arm including a frame which is moved along a pth of travel toward a tool, said mechanism comprising:
   a tool contact member;
   means for mounting the tool contact member to move along the path of travel with the frame until the contact member is brought into contact with the tool to prevent its further movement, said mounting means further comprising means for enabling the frame to thereafter continue to move toward the tool to achieve relative motion between the frame and tool contact member;
   clamping means mounted on the frame for movement between a tool release position and a tool clamping position;
   actuating means positioned between said tool contact member and said clamping means for applying to said clamping means a force generated by said relative motion to move said clamping means from its tool release position to its tool clamping position;
   a locking means positively locking the clamping means in its tool clamping position to secure a tool engaged by the mechanism; and
   actuatable means for releasing the locking means located at discrete positions along the path of movement taken by the tool engaging arm after a tool has been engaged thereby to allow release of the locking means and tool only when the tool engaging arm is in one of the discrete positions.

2. The mechanism of claim 1 wherein:

said clamping means comprises a plurality of jaws; and the actuating means applies a force to each of the jaws having a direction which is opposite to the direction of movement of the tool engaging arm as the arm moves along the path of travel toward the tool.

3. The mechanism of claim 2 wherein:

each of the jaws if an elongated member having a tool gripping element at one of its ends, two of said jaws being pivotally mounted on said frame in spaced apart relationship, the two jaws being pivoted to move their respective tool gripping ends toward one another to move the jaws into their respective tool clamping positions, the jaws being pivoted in the opposite direction to move them into their respective tool release positions.

4. The mechanism of claim 3 wherein said path of travel comprises a linear path and:

the mounting means comprises means for enabling translational relative movement to occur between the contact member and the frame;

each jaw is provided with a cammed surface at its end opposite its tool gripping end; and the actuating means comprises rollers mounted on the tool contact member to act against the cammed surfaces of the jaws to move the tool gripping elements of the jaws toward each other when the contact member is in contact with the tool and the frmae is continuing to move toward the tool along its path of travel.

5. The mechanism of claim 1 wherein:

the locking means is biased into a locked position.

6. The mechanism of claim 2 wherein:

the jaws are biased to an open position.

7. The mechanism of claim 1 wherein:

a pair of spaced apart fingers are joined to the frame and positioned to engage a groove formed in the tool as the tool engaging arm moves toward the tool to provide support for carrying the tool.

8. The mechanism of claim 7 wherein:

a key is joined to the frame between the fingers to engage a complementary keyway formed in the tool as the tool engaging arm moves toward the tool to orient the tool in a specified angular orientation with respect to the arm.

* * * * *